United States Patent [19]

Hoernschemeyer

[11] 3,878,276

[45] Apr. 15, 1975

[54] CELLULOSE ACETATE BLEND MEMBRANES

[75] Inventor: Donald L. Hoernschemeyer, West Covina, Calif.

[73] Assignee: The United States of America as represented by the Secretary of the Interior, Washington, D.C.

[22] Filed: May 24, 1972

[21] Appl. No.: 256,501

[52] U.S. Cl. .................. 264/41; 210/500; 264/49
[51] Int. Cl. ............................................. B01d 13/04
[58] Field of Search ................ 210/500; 264/41, 49

[56] References Cited
UNITED STATES PATENTS

| | | | |
|---|---|---|---|
| 2,644,195 | 7/1953 | Bennes | 264/217 |
| 3,129,159 | 4/1964 | Maier | 210/500 |
| 3,276,996 | 10/1966 | Lazare | 210/500 |
| 3,432,584 | 3/1969 | Cannon | 264/41 |
| 3,460,683 | 8/1969 | Cannon | 264/41 |
| 3,497,072 | 2/1970 | Cannon | 264/49 |

*Primary Examiner*—Eugene C. Rzucidlo
*Attorney, Agent, or Firm*—William S. Brown; Frank A. Lukasik

[57] ABSTRACT

Cellulose acetate reverse osmosis membranes which have an improved product flux and are suitable for use in the desalination of water can be prepared from casting solutions which consist of a cellulose ester having an acetyl content of 41.5 to 42.7 percent by weight of the cellulose ester, a solvent, and an ether alcohol or more specifically an alkyl half-ether of ethylene glycol or diethylene glycol. The casting solutions do not contain a swelling agent or nonsolvent.

7 Claims, No Drawings

CELLULOSE ACETATE BLEND MEMBRANES

BACKGROUND

This invention concerns the preparation of improved semipermeable membranes for separatory processes using reverse osmosis.

Osmosis is a naturally occurring phenomenon observed when a dilute and a concentrated solution are separated by a semipermeable membrane. The solvent will flow through the membrane from the dilute solution into the concentrated one. This process will continue until the flow of solvent is opposed by a pressure equal to the osmotic pressure. The osmotic pressure has a characteristic value depending on the composition and concentration of the individual solutions.

Although the process of osmosis merely results in a partial mixing of the two solutions, the process has been modified to be useful in the separation of pure solvent from a solution. In reverse osmosis, therefore, a solution is contacted with a suitable semipermeable membrane under a pressure greater than osmotic. The result is that pure solvent is forced through the membrane and may be recovered from the opposite side. Such a process has been useful for the purification and separation of a variety of industrial liquids and has generated considerable interest for the purification of saline water. In this latter process saline water at a pressure greater than osmotic is contacted with a semipermeable membrane and essentially pure water is recovered on the other side.

In any reverse osmosis process, and particularly in desalination where large volumes of liquids are to be separated, small variations in the properties of the semipermeable membrane can make substantial differences in the cost of the process. Among the most important of these properties is the salt rejection or selectivity of the membrane which identifies the relative ability of the semipermeable barrier to permit the permeation of solvent and prevent the passage of contaminating salts. While the required salt rejection depends on the quantity of impurities in the feed solution and the purity of the product desired, in general it is desired that the membrane have a sufficiently high selectivity to adequately purify the liquid in a single pass through the membrane. To produce potable water (500 ppm or less total dissolved solids) from brackish water (3,000-5,000 ppm total dissolved solids) it is necessary to have a salt rejection of about 90 to 95 percent, and for the purification of sea water a membrane should generally have a selectivity of at least 99 percent. The numerical value for the percentage salt rejection is one hundred times the difference in the salt concentration in the feed and the product divided by the salt concentration in the feed.

Even if a membrane has a perfect (100 percent) salt rejection its commercial utility will be severely limited if the product water merely trickles through it. Thus, a second parameter indicative of an economical membrane is its product flux, i.e., the rate of flow of product through a given unit area of membrane, often measured in units of gallons/sq. ft/day (gfd). Although reverse osmosis desalination devices have been designed to incorporate a large membrane surface area in a small volume of equipment, nevertheless, high membrane flux is still important to an economical desalination process.

Finally, the third criteria of a suitable reverse osmosis membrane is that it demonstrate adequate salt rejection and product flux for a reasonable length of time. Unfortunately, during the course of desalination numerous things can happen which detract from these properties. For example, ruptures in the membrane can develop which allow the free passage of contaminated feed through the membrane and into the product; the membrane can be compacted from the high pressures used in reverse osmosis, thereby reducing the membrane porosity and flux; or the membrane surface can be fouled by materials in the feed or destroyed by biological attacked. Because of the tremendous expense involved in dismantling the desalination equipment and replacing the large surface area of membranes, it is desirable that the membrane be impervious to these problems and continue to perform in an economical manner for as long as possible.

Among the membranes which have been developed to date, asymmetric cellulose acetate membranes appear to have the best combination of the three basic properties: selectivity, flux, and durability. These membranes consist of two distinct layers of cellulose acetate formed in an integral process. One layer, the thinner of the two, is quite dense and it is primarily responsible for the selectivity of the membrane. The other layer is thicker and consists of an open celled structure which offers little resistance to the flow of product water which permeates the thin skin. The primary significance of this porous layer is that it offers structural support for the thin skin. This membrane is called "asymmetric" because its properties depend on its orientation with respect to the feed stream, the properties of the membrane being much better when the skin faces the feed than when the porous substructure is in this position.

The first asymmetric membranes were discovered in the early 1960s and the basic process used in preparing them is described in U.S. Pat. Nos. 3,133,132, 3,133,137, and 3,170,867. In this process a casting solution is prepared consisting of the polymer, a solvent, a non-solvent such as water, and a swelling agent. This solution is cast into a thin film and then allowed to partially evaporate. The film is then immersed in cold water to complete the removal of solvent and then annealed to improve the salt rejection. Membranes so produced have excellent salt rejection and flux. If they have a defect it is that their flux tends to decline rather rapidly, possibly because of the compaction of the porous substructure.

Various modifications to this basic process have been explored with varying success. Among the significant discoveries is the finding that cellulose acetate with a particular acetyl content has the maximum combination of water flux and salt rejection. For example, U.S. Pat. No. 3,497,072 shows membranes containing cellulose acetate with 41.5 to 42.7 weight percent acetyl. These membranes were produced by blending commercial grades of cellulose acetate or acetylating cellulose to the desired degree. The casting solution consists of the polymer, a solvent mixture of acetone and 1,4-dioxane, a swelling agent, such as maleic acid, and a non-solvent such as water or methanol. U.S. Pat. No. 3,460,683 demonstrates that acceptable blend membranes containing 37.8 to 40.8 weight percent acetyl can be produced from a solution which does not contain a swelling agent.

It is an object of the present invention to provide reverse osmosis membranes which have better properties and are more economical than those used in the prior art.

It is a further object of my invention to prepare these improved membranes from a casting solution which is different from those previously employed.

THE INVENTION

I have now found that improved blend membranes can be prepared from a solution consisting of cellulose acetate of the proper acetyl content, a solvent, and a compound which belongs to the class of ether-alcohols, specifically aklyl half-ethers of ethylene glycol or diethylene glycol. This latter compound replaces the non-solvent and the swelling agent employed in the casting formulations of the prior art.

The salient feature of the membranes produced from this casting formulation is that for a given percentage salt rejection these membranes exhibit a higher product flux than the membranes produced by the prior art. For example, membranes were prepared from a mixture of cellulose acetate having an acetyl content of 41.5 weight percent, a solvent consisting of a mixture of acetone and p-dioxane, and an ether-alcohol. These membranes were compared with membranes produced from formulations consisting of cellulose acetate of 41.5 percent acetyl, acetone, dioxane, methanol and maleic acid. These membranes were then tested on a 1 percent sodium chloride solution at a pressure of 800 psig and a temperature of 25°C. A comparison of the membrane properties is given in Table 1 which indicates for a given selectivity the improvement in product flux achieved by the present invention over the blend membranes previously used. The results show a significant improvement in product flux particularly at salt rejections useful for the purification of brackish water.

TABLE I

| Salt Rejection % | Prior Blend Membranes Flux (gfd) | Present Blend Membranes Flux (gfd) | Flux Improvement % |
| --- | --- | --- | --- |
| 92 | 40 | 51 | 37 |
| 88 | 46 | 62 | 35 |
| 80 | 56 | 76 | 36 |

Generally, the polymer which is useful in my invention is cellulose acetate with an acetyl content within the range of 41.5 to 42.7 weight percent. Cellulose acetate membranes of this type are often referred to as "blend" membranes because the desired degree of acetylation is frequently achieved by blending commercially available grades of cellulose acetate. At the present time, cellulose acetate does not appear to be marketed in a grade which meets this requirement. Alternatively, the cellulose acetate composition may be initially prepared by acetylation to provide the desired acetyl content without resorting to the blending technique.

As discussed in U.S. Pat. No. 3,497,072 herein incorporated by reference, the most acceptable solvent for the cellulose acetate blend is a mixture of acetone and 1,4-dioxane. Because this combination provides a solvent generally capable of dissolving cellulose acetate over a wide range of acetyl content, it is useful when the desired acetyl content is achieved by dissolving and blending a cellulose triacetate and a cellulose diacetate. Generally in a formulation using 20 grams of cellulose acetate, from 70 to 100 grams of solvent will be used and preferably from about 80 to 90 grams of which at least 30 grams are acetone. Other suitable solvent systems may also be used.

The remaining element in the casting formulation is the ether alcohol which replaces the swelling agent and the non-solvent previously employed. In initial experiments it was found that acceptable membranes can be prepared from a solution of the appropriate cellulose acetate blend in a solvent mixture of acetone and dioxane. Tested on a 1 percent sodium chloride solution at 800 psig these membranes demonstrated 99 percent salt rejection and a product flux of 20 gfd. Since membranes produced from a solution using acetone as the only solvent, were dense and exhibited a flux of essentially zero, the success of the membranes using acetone and dioxane in the absence of a swelling agent and a non-solvent is best explained on the basis that the ether group in p-dioxane acts as an effective replacement for the swelling agent.

Accordingly, it was hypothesized that a compound containing a hydroxyl group might be an effective replacement for the non-solvent, hydrogen bonding components (methanol and maleic acid), and if this compound contained an ether group, it would assist the dioxane as a replacement for the swelling agent. Experiments verified that ether alcohols were useful in the preparation of these membranes. The product fluxes of these membranes were greater than those formed from solutions containing only acetone and dioxane. Among the ether alcohols which have been used, the alkyl half-ethers of ethylene glycol or diethylene glycol have been found to be particularly suitable. Specific materials include 2-methoxyethanol, 2-ethyoxyethanol, 2-(2-methoxyethoxy) ethanol, 2-(2-ethoxyethoxy) ethanol, 2-ethoxyethyl acetate, 2-(2-ethoxyethoxy)ethyl acetate, 2,2'-oxydiethanol, and tetrahydrofurfuryl alcohol. The appropriate amount of this reagent to be employed in a solution containing twenty grams of cellulose acetate is from 2 to 25 grams and preferably from about 6 to 15 grams although other amounts may be found desirable in particular formulations.

After the polymer solution has been prepared it can be cast on an appropriate surface such as a mylar belt or a glass plate using any of the standard techniques known in the art. These membranes can be cast in a variety of configurations including the flat plate and the hollow tube variety. Following the casting of a thin liquid film this film is exposed to the air for a period of about 3 to 30 seconds, preferably about 5 seconds. The film is then gelled in ice water for about 1 to 5 minutes and then annealed in hot water at a temperature of about 60° to 80°C for 3 to 5 minutes. Consistent with observations made on asymmetric membranes produced from casting solutions used in the prior art, hotter annealing temperatures and longer annealing treatments increasingly contract the skin layer and improve the salt rejection of the membrane with a concurrent reduction in product flux. The membrane is then ready for use.

Finally, although my invention has been described with particular regard to the desalination of water, the improved membranes prepared by the process of my invention may also be used for the separation of water from electrolyte solutions such as sea water, brackish water, acid mine water, and industrial brines and bitterns; the separation of organic liquids; the purification and concentration of liquid foods such as citrus juices, beer, and syrups; and the purification of liquid wastes such as urine.

EXAMPLE 1

Casting formulations were prepared using 10 grams of E-398-3 and 10 grams of A-432-130B cellulose acetates (Eastman Chemical Corp., Kingsport, Tenn. having 39.8 and 43.2 wt. precent acetyl content respectively) to achieve an average acetyl content of 41.5 weight percent. To this solution acetone, dioxane, and 2-methoxyethanol were added in the amounts given in Table II. Flat membranes were cast and after exposure for five seconds were immersed in ice water for 5 minutes. These membranes were then annealed in hot water at 65°C for 5 minutes. The resulting membranes were tested at 800 psig with a 1 percent sodium chloride solution, the standard test conditions used in these examples. The osmotic properties of the membranes are given in Table II.

TABLE II

| Test | Dioxane (Grams) | Acetone (Grams) | 2-Methoxyethanol (Grams) | Reverse osmosis Performance | |
|------|-----------------|-----------------|--------------------------|------------------------------|---|
|      |                 |                 |                          | Flux (GFD) | selectivity (%) |
| 1 | 60 | 30 | 6  | 23 | 97 |
| 2 | 60 | 30 | 9  | 34 | 96 |
| 3 | 60 | 30 | 12 | 51 | 93 |
| 4 | 60 | 30 | 15 | 53 | 92 |
| 5 | 50 | 40 | 18 | 28 | 94 |
| 6 | 50 | 30 | 22 | 71 | 84 |

EXAMPLE 2

A polymer solution was prepared exactly as in example 1 with the exception that 2-ethoxyethanol was used in place of 2-methoxyethanol. The membranes were then prepared and tested as in the previous example and the results are shown in Table III.

Table III

| Test | Dioxane (Gram) | Acetone (Grams) | 2-Ethoxyethanol (Grams) | Reverse osmosis Performance | |
|------|----------------|-----------------|-------------------------|------------------------------|---|
|      |                |                 |                         | Flux (GFD) | selectivity (%) |
| 1 | 60 | 30 | 6  | 15 | 97 |
| 2 | 60 | 30 | 12 | 23 | 97 |

EXAMPLE 3

Again membranes were prepared and tested as in Example 1 with the exception that 2-(2-methoxyethoxy)ethanol was used in place of 2-methoxyethanol. The results are given in Table IV.

Table IV

| Test | Dioxane (Grams) | Acetone (Grams) | 2-(2-methoxyethoxy)ethanol (Grams) | Reverse Osmosis Performance | |
|------|-----------------|-----------------|------------------------------------|------------------------------|---|
|      |                 |                 |                                    | Flux Selectivity (GFD) | (%) |
| 1 | 60 | 30 | 6  | 52  | 92 |
| 2 | 60 | 30 | 12 | 115 | 46 |

EXAMPLE 4

Membranes were prepared and tested as in example 1 with the exception that 2-(2-ethoxyethoxy)ethanol was used in the casting formulation instead of 2-methoxyethanol. Casting solution components in addition to the cellulose acetate are given in Table V along with the reverse osmosis performance characteristics of the resulting membranes.

Table V

| Test | Dioxane (Grams) | Acetone (Grams) | 2-(2-Ethoxyethoxy) Ethanol (Grams) | Reverse osmosis Performance | |
|------|-----------------|-----------------|-------------------------------------|------------------------------|---|
|      |                 |                 |                                     | Flux selectivity (GFD) | (%) |
| 1 | 60 | 30 | 6  | 57  | 91 |
| 2 | 60 | 30 | 12 | 124 | 44 |
| 3 | 50 | 40 | 8  | 39  | 95 |
| 4 | 50 | 40 | 12 | 71  | 82 |
| 5 | 50 | 40 | 16 | 122 | 43 |
| 6 | 50 | 30 | 16 | 210 | 32 |
| 7 | 50 | 30 | 18 | 200 | 30 |
| 8 | 50 | 30 | 22 | 225 | 20 |

I claim:

1. In a process for the preparation of a reverse osmosis membrane consisting of
    preparing a solution of cellulose acetate in an organic solvent, said cellulose acetate having an acetyl content in the range of 41.5 to 42.7 percent by weight of the cellulose acetate,
    casting said solution as a thin film,
    allowing the solvent to partially evaporate from said film,
    immersing said film in cold water to obtain a film having a swollen gel structure, and
    annealing said swollen film to increase the salt rejection of said membrane;
    the improvement comprising:
        incorporating an ether alcohol from the group consisting of 2-methoxyethanol, 2-ethoxyethanol, 2-(2-methoxyethoxy) ethanol and 2-(2-ethoxyethoxy) ethanol in said solution of cellulose ester, said solution further being characterized by the absence of non-solvents and swelling agents.

2. The process of claim 1 wherein said organic solvent is a mixture of acetone and p-dioxane.

3. The process of claim 2 wherein said ether alcohol is 2-methoxyethanol.

4. The process of claim 2 wherein said ether alcohol is 2-ethoxyethanol.

5. The process of claim 2 wherein said ether alcohol is 2-(2-methoxyethoxy) ethanol.

6. The process of claim 2 wherein said ether alcohol is 2-(2-ethoxyethoxy) ethanol.

7. In a process for the desalination of water by reverse osmosis, the improvement comprising using, as a reverse osmosis membrane, a membrane prepared by a process consisting of
    preparing a solution of cellulose acetate and an ether alcohol from the the group consisting of 2- methoxyethanol, 2-ethoxyethanol, 2-(2-methoxyethoxy) ethanol and 2-(2-ethoxyethoxy) ethanol in an organic solvent, said cellulose acetate having an acetyl content in the range of 41.5 to 42.7 percent by weight of the cellulose acetate, casting said solution as a thin film, allowing the solvent to partially evaporate from said film, immersing said film in cold water to obtain a film having a swollen gel structure, and annealing said swollen film to increase the salt rejection of said membrane.

* * * * *